April 28, 1970  R. D. REIS  3,508,735

VALVE

Filed Dec. 20, 1967  2 Sheets-Sheet 2

3,508,735
VALVE
Robert D. Reis, Hingham, Mass., assignor to United Electric Controls Company, Watertown, Mass., a corporation of Massachusetts
Filed Dec. 20, 1967, Ser. No. 692,215
Int. Cl. F16k 31/165
U.S. Cl. 251—61.4                                    9 Claims

ABSTRACT OF THE DISCLOSURE

A refrigeration system in which liquid nitrogen is injected into a refrigeration chamber through a pressure-operable valve and the pressure-operable valve contains a fluid chamber, a valve chamber and a pressure chamber, the latter containing a diaphragm supported part operable to effect movement of the valve in a manner to control flow of the liquid nitrogen through the fluid chamber to the refrigeration chamber, and the valve being provided with means for maintaining the valve chamber and the component parts therein subjected to movement at a temperature corresponding substantially to the liquid nitrogen passing through the fluid chamber to prevent frosting.

BACKGROUND OF THE INVENTION

Refrigeration systems employing liquid nitrogen for effecting cooling of a storage or refrigeration space by expansion of the liquid nitrogen in the space and valves for controlling the flow of liquid nitrogen in such a system are not new. However, the low temperatures incident to systems of this kind is troublesome, producing condensation, frosting and sticking of movable parts and hence is exceptionally abusive. The purpose of this invention is to provide a system and controlling valve which is relatively free of frosting and hence reliable and sensitive in operation.

SUMMARY

The system comprises in combination a refrigeration chamber, a source of refrigerant, and a pressure-operable valve in closed circuit. The refrigerant source provides a liquid and gaseous medium of nitrogen and the pressure-operable valve embodies a valve element shiftable by the pressure of the gaseous medium delivered thereto from the source to terminate flow of the liquid medium through the pressure-operable valve and by venting of the gaseous medium therefrom to permit flow of the liquid medium through and into the refrigeration chamber. A temperature-sensing device responsive to the temperature in the refrigeration chamber connected to the pressure-operable valve is operable when the temperature in the refrigeration chamber decreases to permit the gaseous pressure to enter the pressure-operable valve and when the temperature increases to terminate such flow.

The pressure-operable valve comprises a valve body containing a fluid chamber to which and from which there are inlet and outlet ports and a valve chamber connected to the fluid chamber. A valve element is situated in the valve chamber embodying a valve part extending therefrom into the fluid chamber to control the flow of fluid through the fluid chamber. The valve has a valve seat in the fluid chamber situated between the inlet and outlet ports provided with a beveled peripheral edge and the valve part has a peripheral edge which is convex in vertical section for contact with the valve seat. Preferably the valve part is Teflon. There is means for insulating the valve chamber in the form of a manifold surrounding the valve chamber and in communication therewith into which the gaseous medium is adapted to be admitted in sufficient volume to flow from the manifold through a vent therein to the atmosphere. A porting chamber connects the valve chamber with the fluid chamber and contains the outlet port and the portion of the valve extending from the valve chamber into the fluid chamber. A gland at the junction of the valve chamber and the porting chamber including an extendable sleeve sealed at one end to the gland and at its other end to the distal end of the valve prevents the fluid in the fluid chamber from gaining access to the valve chamber exteriorly thereof. A guide supports the distal end of the valve element in the valve chamber and a spring disposed in the chamber about the valve and the sleeve operates to hold the valve seated in opposition to means at the lower end of the valve for effecting movement thereof to unseat it. The valve operating means comprises a diaphragm supported part mounted in a pressure chamber at the distal end of the valve chamber in confronting relation to the distal end of the valve element. The pressure chamber contains a port to which the gaseous medium is admissible to displace the diaphragm supported part and in turn to effect movement of the valve. A small diameter bleed passage through the diaphragm supported part permits the gaseous medium in the pressure chamber to enter the valve chamber and the manifold chamber from which it flows through the vent in the manifold chamber to the atmosphere. The gland is of circular cross-section and the portion of the valve extending therethrough is of hexagonal cross-section and somewhat smaller to afford a clearance between the inside surface of the gland and the outside surface of the portion of the valve passing through it.

The invention will now be described in greater detail with reference to the accompanying drawings wherein.

Figure 1:
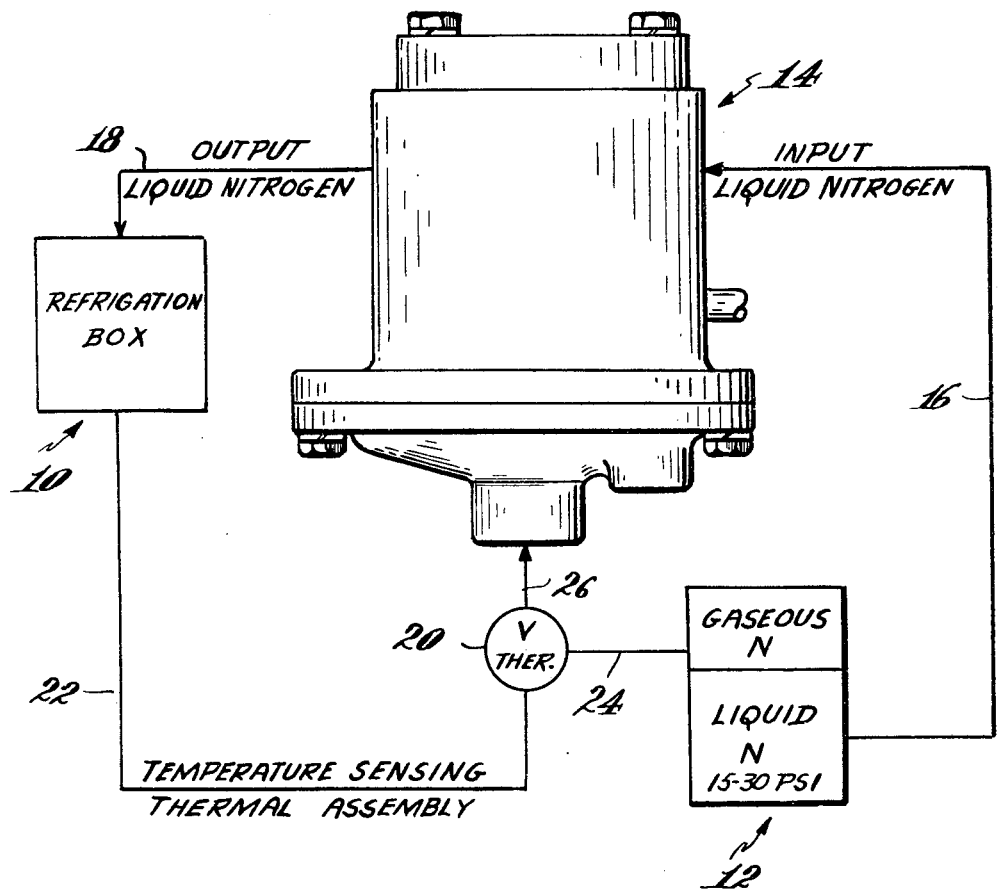
FIG. 1 is an elevation of a valve showing the refrigeration circuit in which it is used diagrammatically.

Referring to the drawings (FIG. 1) there is shown a refrigeration box 10 which may be a stationary refrigeration chamber or a mobile chamber on a truck or railway car. A source of liquid nitrogen 12 is provided for supplying liquid nitrogen to the refrigeration box and control of the delivery of liquid nitrogen to the refrigeration box is provided by a pressure-operable valve 14, the input side of which is connected to the liquid nitrogen source 12 by a conductor 16 and the output side of which is connected to the refrigeration box by a conductor 18. A temperature-responsive valve 20 connected by a conductor 22 to the refrigeration box is operable by a drop in temperature to provide for flow of gaseous nitrogen located above the upper surface of the liquid nitrogen in the nitrogen source 12 by way of conductors 24 and 26, to the pressure-operable valve 14 to displace a diaphragm, as will be described hereinafter, in a direction to unseat a valve element therein thus to permit liquid nitrogen to flow through the pressure-operable valve 14 to the refrigeration box. When the temperature in the refrigeration box reaches a predetermined lower level, the temperature-responsive valve 20 terminates flow through the conductors 24, 26 to the pressure-operable valve 14 and vents the pressure-operable valve 14, so that the valve element therein seats and thus terminates flow of liquid nitrogen to the refrigeration box.

Figure 2:
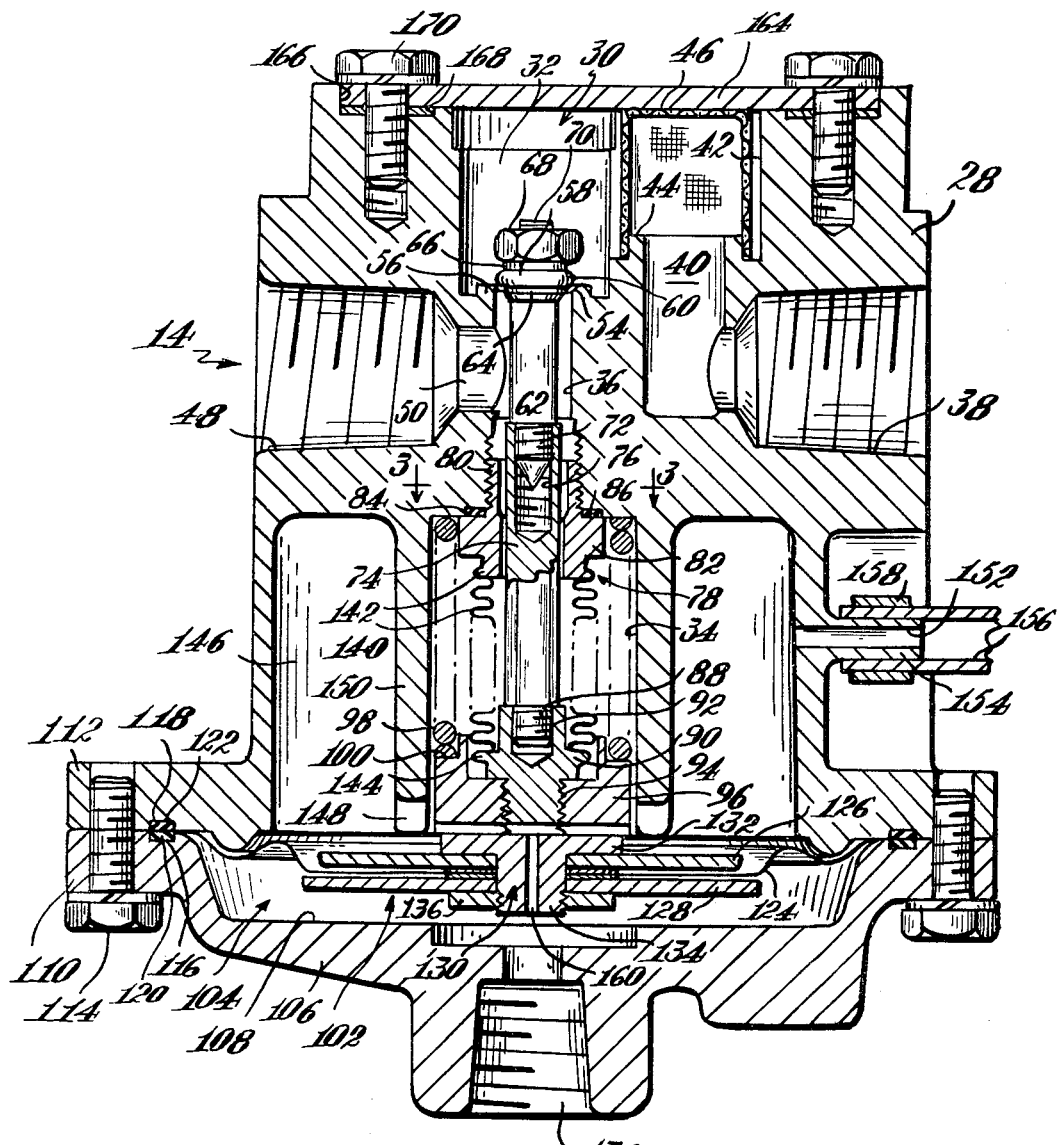
FIG. 2 is a vertical section through the valve.

As disclosed in FIG. 2 the pressure-operable valve 14 comprises a valve body 28 which is substantially circular in cross-section, although not necessarily so, which contains lengthwise thereof a chamber 30, the latter extending from one end of the body to the other and comprising tandemly arranged chambers of different diameter, a fluid chamebr 32 of intermediate diameter, a valve chamber 34 of large diameter, and a porting chamber 36 of small diameter. An inlet port 38 enters the valve body at a level approximately midway between the upper and lower ends of the porting chamber 36 and is connected by a passage 40 to the fluid chamber 32 through a filter chamber 42 of relatively large size to provide for unrestricted flow and at the same time to enable filtering the fluid entering the fluid chamber 32 from the port 38. At the end trance to the filter chamber 42 from the passage 40 there is an annular shoulder 44 for telescopically receiving and supporting the lower end of a relatively fine mesh filter screen 46. The filter screen is cylindrical in configuration and provides a relatively large area for unrestricted flow of the fluid from the inlet port 38 through the conductor 40 and filter 42 into the fluid chamber 32. An outlet port 48 is located in the opposite side of the body substantially diametrically opposite the inlet port 38 and at substantially the same level, and is connected to the porting chamber 36 by a short passage 50.

Figure 3:
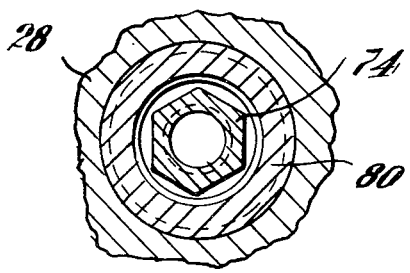
FIG. 3 is a horizontal section through the valve taken on the line 3—3 of FIG. 2.

A valve seat and valve element are arranged to control the flow of fluid through the valve, the valve seat being located at the junction of the chambers 32 and 36, and the valve element being supported for the most part in the valve chamber 34 with a portion extending through the porting chamber 36 for engagement with the seat. As illustrated, the valve seat comprises a flat beveled surface 54 formed peripherally at the inner side of an annular shoulder 56 projecting into the bottom of the fluid chamber 32. The valve element comprises a valve part 58 which is annular and has a convex peripheral surface 60 for engagement with the flat seat 54. Preferably the part 58 is Teflon and provides sealing at low temperature when employing commercial tolerances for machining the seat. The part 58 is mounted on a stem 62, being seated against a shoulder 64 thereon and held in place by a washer 66 and a nut 68 applied to a threaded portion 70 at its upper end so that it may be readily removed and replaced when worn out. The lower end of the stem 62 is threaded at 72 and screwed into the upper end of a spindle 74, the latter having at its upper end an internally threaded bore 76. The spindle 74 extends downwardly from the stem 62 into the valve chamber 34 through a gland 78 and, as will appear hereinafter, provides means for moving the valve part 58 relative to its seat. The gland 78 is in the form of a bushing having an externally threaded sleeve-like portion 80 threaded into the lower end of the porting chamber 36 and a head 82 situated in the valve chamber which is of somewhat smaller diameter than the valve chamber and which is screwed tightly against an annular Teflon ring 84 seated in an annular groove 86 at the junction of the chambers 34 and 36. The inside of the bushing is of circular cross-section (FIG. 3) and the cross-section of the spindle 74 is hexagonal, so that while the bushing provides a bearing for guiding the spindle 74, there is sufficient clearance between the inside surface of the bushing and the spindle to minimize constraint due to the formation of frost on the respective surfaces.

The lower end of the spindle 74 is provided with a threaded portion 88 which has mounted on it a connector 90 containing an internally threaded bore 92 into which the spindle is screwed and an externally threaded portion 94 which is screwed into a bearing guide 96, corresponding substantially in diameter to the inside diameter of the valve chamber 34 for supporting and guiding the lower end of the spindle for movement. The guide improves the movement of the valve stem and improves the life of the bellows. The valve part 58 is normally held engaged with its seat by means of a coiled spring 98 mounted in the valve chamber about the spindle with one end encircling the head 82 of the gland and the other seated on an annular groove 100 formed on the bearing guide 96. The spring 98 is designed to allow the valve to open at a predetermined pressure and to be fully opened with a very slight increase in pressure above this predetermined cracking pressure.

At the lower or distal end of the spindle 74 there is means for effecting movement thereof in opposition to the coiled spring 98 to lift the valve part 58 from its seat when the system calls for added refrigerant. This means comprises a part 102 mounted in a pressure chamber 104 in confronting relation to the lower end of the spindle for movement in response to pressure supplied to the chamber. The pressure chamber 104 is constituted by an end member 106 containing a shallow circular recess 108 having an annular flange 110 for engagement with a corresponding lateral flange 112 at the lower end of the valve body. The confronting faces of the flanges 110 and 112 contain concentric annular grooves 116 and 118 of corresponding diameter in which are situated Teflon rings 120 and 122 held in compressive contact with each other by bolts 114 which secure the flanges together. The part 102, situated within the pressure chamber, is supported therein by a flexible diaphragm 124, the marginal edge of which is clamped between the flanges 110 and 112 and comprises flat, rigid, circular plates 126 and 128 mounted centrally of the diaphragm at opposite sides thereof and secured thereto by a ferrule 130 provided with a flat head 132 and a threaded shank 134, the shank extending through the plates 126 and 128 and being secured by a nut 136 screwed onto its lower end against the lower surface of the plate 128 so as to bind the head 132 against the upper surface of the plate 126. The diaphragm is comprised preferably of Teflon coated glass fabric; however, buna N rubber may be employed or any other equivalent material.

The end member 106 contains centrally thereof an inlet port 138 through which the fluid (preferably nitrogen gas) may enter the pressure chamber 104 at the underside of the diaphragm to move the part 102 upwardly against the lower end of the spindle 74.

To provide a leak-proof seal between the porting chamber and the valve chamber an extensible sleeve 140 (bellows) is mounted in the valve chamber 34 about the spindle 74 with one end hermetically secured to an annular lip 142 on the head 82 of the gland 78 and its other end hermetically secured to a lip 144 formed on the connector 90 at the distal end of the spindle. The sleeve 140 contains any of the fluid passing through the valve from the entrance port 38 to the exit port 48, preventing it from leaking into the valve chamber 34 and from thence through its open lower end to the upper side of the diaphragm and supported part 102. A manifold chamber 146 is formed in the valve body around the valve chamber 34 which corresponds substantially in length thereto and is in communication therewith at its lower end through openings 148 in the wall 150 which separates them. A vent hole 152 is provided in the outside wall of the manifold chamber, being provided with an outwardly projecting nipple 154 on which there is mounted a vent line 156 secured to the nipple by a spring ring or clip 158. The vent hole 152 permits clearing the manifold of frost and the vent line 156 is preferably made long enough, for example, approximately five feet in length, so that downward movement of the diaphragm will not suck in enough moist air to reach the manifold and hence cause frosting.

The ferrule 130, by means of which the plates 126 and 128 are clamped to the diaphragm, contains a central bleed passage 160 of small diameter through it which connects the pressure chamber 104 at the inlet port side of the diaphragm with the valve chamber 34 and the manifold chamber 146 at the opposite side of the diaphragm, so that a small amount of the signal fluid, that is the gaseous medium, flows into and through the valve and manifold chambers 34 and 146 and out through the vent thus purging the chambers. Since the gaseous medium N2 is always at close to room temperature it makes an excellent purging medium.

To provide for quick removal of the filter screen 46 and/or replacement of the Teflon valve part 58, a flat cover plate 164 is secured to the upper end of the valve body across the open upper end of the fluid chamber 32 in a recess 166 against an annular Teflon gasket 168 by means of screw bolts 170.

In operation when the temperature in the refrigeration box or chamber 10 falls to the desired level, the temperature-responsive valve 20 will respond to this lower temperature to check the flow of nitrogen gas from the source 12 through it and the conductor 26 to the lower side of the diaphragm supported member 102, whereupon the spring 98 will pull the valve part 58 into engagement with its seat, the pressure at the lower side of the diaphragm being vented through the temperature-responsive valve 20 in conventional fashion. The valve will remain in this closed position until the temperature in the refrigeration box begins to rise above the predetermined level desired, whereupon the temperature-responsive valve 20 will open so as to permit gaseous nitrogen to flow through it from the conductor 24 by way of the conductor 26 to the lower side of the diaphragm supported member 102 thus raising the valve element in opposition to the spring 98 and raising the valve part 58 from its seat. This permits liquid nitrogen to flow through the port 38 through the filter 46 into the fluid chamber 34 and from thence into the ported chamber 36 and through the outlet port 48 and conductor 18 to the refrigeration box or chamber 10.

I claim:

1. A valve comprising a valve body containing a fluid chamber to which and from which there are inlet and outlet ports, a valve chamber connected to the fluid chamber, a valve element in the valve chamber, said valve element embodying a valve part extending into the fluid chamber to control the flow of fluid through the fluid chamber, a manifold surrounding the valve chamber, a vent connecting the manifold to the atmosphere, and means for supplying a fluid to said manifold in sufficient volume to induce flow of the fluid from the manifold through said vent.

2. A valve comprising a valve body containing a fluid chamber to which and from which there are inlet and outlet ports, a valve chamber connected to the fluid chamber, a valve element in the valve chamber, said valve element embodying a valve part extending into the fluid chamber to control the flow of fluid through the fluid chamber, a manifold in the valve body surounding the valve chamber, said manifold being in communication with said valve chamber, a vent in the manifold to the exterior of the valve body, an inlet passage to the manifold to which a fluid is adapted to be admitted into the manifold and valve chamber in such volume as to flow through the manifold chamber and escape through the vent to the atmosphere, and a gland between the fluid chamber and the valve chamber through which the valve part extends, said gland providing a fluid seal between the fluid chamber and the valve chamber.

3. A valve comprising a valve body containing a fluid chamber to which and from which there are inlet and outlet ports, a valve chamber connected to the fluid chamber, a valve element in the valve chamber, said valve element embodying a valve part extending into the fluid chamber adapted by engagement with and disengagement from a valve seat to control the flow of fluid through the fluid chamber, a gland situated between the fluid chamber and the valve chamber through which said part of the valve element extends from the valve chamber into the fluid chamber, an extendable member fixed at one end to the gland around the valve element and at its other end to the distal end of the valve element, said extendable member preventing fluid in the fluid chamber from escaping into the valve chamber, means in the valve chamber at the distal end of the valve element for effecting movement in a direction to disengage the valve element from said valve seat, and means in the valve chamber surrounding the extendable member operating on the distal end of the valve element to hold it engaged with said valve seat.

4. A valve according to claim 3, wherein the gland has a circular cross-section and the portion of the valve element passing through it is of non-circular cross-section and of smaller cross-sectional area so that there is a clearance between the inner peripheral surface of the gland and the outer peripheral surface of the portion of the valve element passing through it.

5. A valve according to claim 3, wherein the gland has a circular cross-section and the portion of the valve element passing through it is hexagonal and of smaller cross-sectional area so that there is a clearance between the inner peripheral surface of the gland and the outer peripheral surface of the portion of the valve element passing through it.

6. A valve comprising a valve body containing a fluid chamber to which and from which there are inlet and outlet ports, a valve chamber connected to said fluid chamber, a valve element in said valve chamber, said valve element embodying a valve part extending into the fluid chamber to control the flow of fluid through the chamber, said fluid chamber embodying a valve seat with which said valve part is engageable, a gland situated in said connection, said part of the valve element extending into the fluid chamber extending through said gland, a bearing guide in the valve chamber at the distal end of the valve element, said bearing guide beign fixed to the valve element and slidable within the valve chamber with the valve element as the latter is moved to effect engagement and disengagement of the valve part with the seat, means at the distal end of the valve element operable to effect movement thereof, a sleeve surrounding the valve element hermetically connected at one end of the gland and at its other end to the bearing guide, a coil spring in the valve chamber surounding the sleeve with one end fixed and the other end bearing on the guide, said spring opposing movement of the valve element in a direction to unseat the valve part, a vent in said body in communication with the valve chamber externally of the sleeve, and means for supplying a fluid pressure at higher than atmospheric pressure to the valve chamber externally of the sleeve in sufficient volume to induce unilateral flow of the fluid from the chamber through the vent therein to the atmosphere.

7. A valve comprising a valve body containing a fluid chamber to which and from which there are inlet and outlet ports, a valve chamber connected to the fluid chamber, a valve element in the valve chamber, said valve element embodying a valve part extending into the fluid chamber to control the flow of fluid through the fluid chamber, a pressure chamber located at the distal end of the valve chamber, a part in said pressure chamber operable by movement therein to effect movement of the valve element, said part dividing the valve chamber from the pressure chamber, a manifold chamber surrounding the valve chamber and in communication with said part dividing the valve chamber from the pressure chamber, said pressure chamber containing an inlet port through which pressure is admissible to effect movement of the part, a bleeder passage through said part dividing the valve chamber from the pressure chamber through which a small amount of the fluid supplied to the pressure chamber bleeds into the valve and manifold chambers, and a vent in the wall of the manifold chamber through which fluid entering the manifold chamber from the pressure chamber can escape.

8. A valve comprising a valve body containing a fluid chamber to which and from which there are inlet and outlet ports, a valve chamber connected to the fluid chamber, a valve element in the valve chamber, said valve element embodying a valve part extending into the fluid chamber to control the flow of fluid through the fluid chamber, a pressure chamber located at the distal end of the valve chamber and in communication therewith, a diaphragm in said pressure chamber, a diaphragm supported part in said pressure chamber confronting the distal end of the valve chamber, said valve chamber permitting said part to move within the pressure chamber to apply pressure to the valve element in a direction to lift the valve from its seat, a port in the pressure chamber for admitting fluid pressure to the pressure chamber to effect movement of the diaphragm supported part, a bleeder passage through the diaphragm supported part connecting the pressure chamber to the valve chamber, and a vent connecting the valve chamber to the atmosphere.

9. A valve comprising a valve body containing a fluid chamber to which and from which there are inlet and outlet ports, a valve chamber connected to the fluid chamber, a valve element in the valve chamber, said valve element embodying a valve part extending into the fluid chamber to control the flow of fluid through the valve chamber, an annular manifold chamber in the valve body surrounding the valve chamber, a pressure chamber in communication with the valve chamber and said surrounding manifold chamber, said pressure chamber being constituted by an end member bolted to the valve body in confronting relation to the valve chamber and said surrounding manifold chamber, said end member containing a recess concentric with the valve chamber and said surrounding manifold chamber, a diaphragm in said pressure chamber, said diaphragm being supported therein with its edges secured between the valve body and said end member, said end member containing a port in communication with the pressure chamber and concentric equal diameter grooves in confronting faces of the valve body and the end member in which are seated confronting sealing rings in compressive contact with each other.

References Cited

UNITED STATES PATENTS

| | | | |
|---|---|---|---|
| 848,739 | 4/1907 | Gut | 251—46 |
| 2,246,148 | 6/1941 | Stephenson | 251—61.4 XR |
| 2,250,362 | 7/1941 | Dube | 251—61.4 XR |
| 2,925,987 | 2/1960 | Priesmeyer | 251—61.4 |
| 3,074,684 | 1/1963 | Doyle | 251—46 XR |
| 3,084,901 | 4/1963 | Thorburn | 251—61.4 |

MERVIN STEIN, Primary Examiner

U.S. Cl. X.R.

62—45, 55; 251—335